Nov. 18, 1969   J. F. SPIELMAN   3,479,052
HAND-PULLED GOLF CART

Filed Aug. 7, 1967   4 Sheets-Sheet 2

INVENTOR:
James F. Spielman

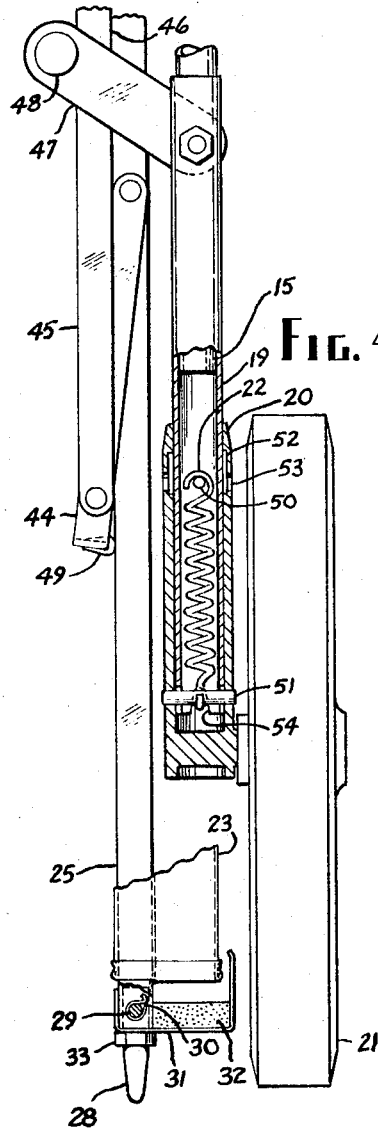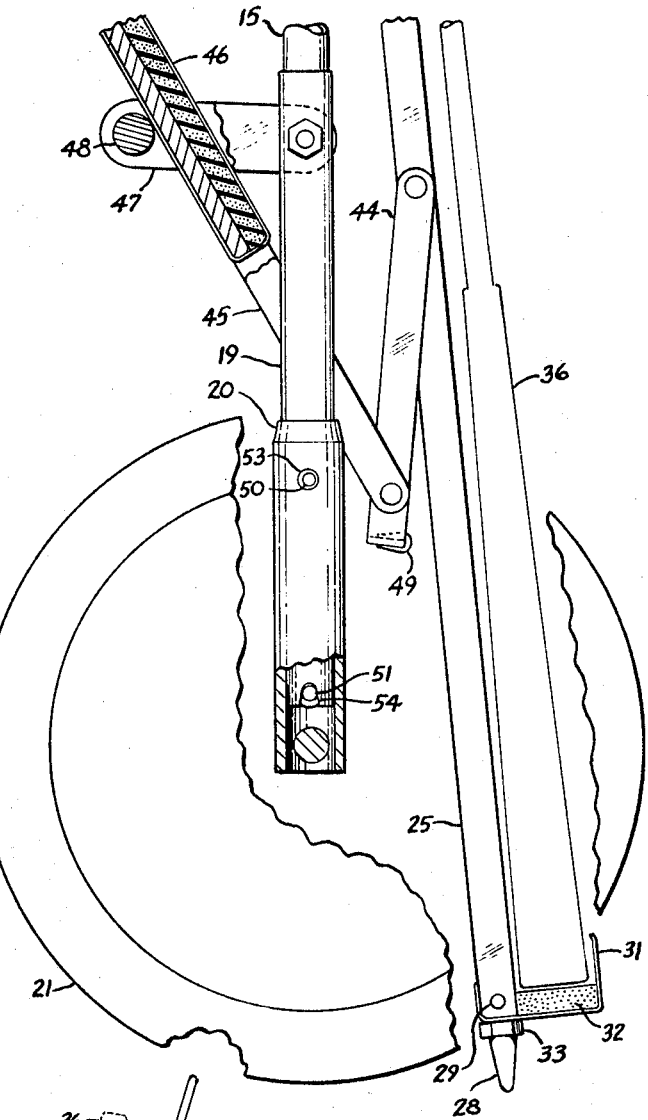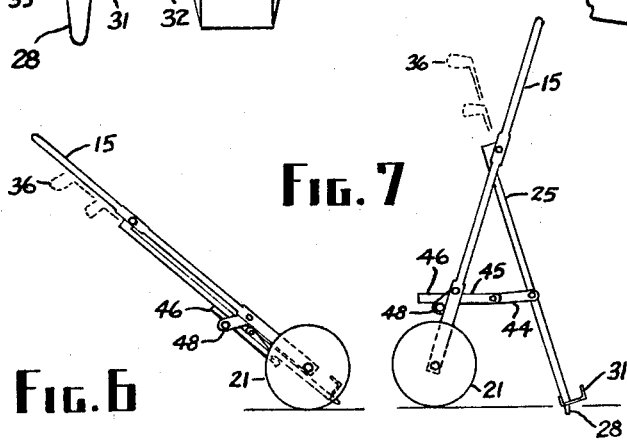

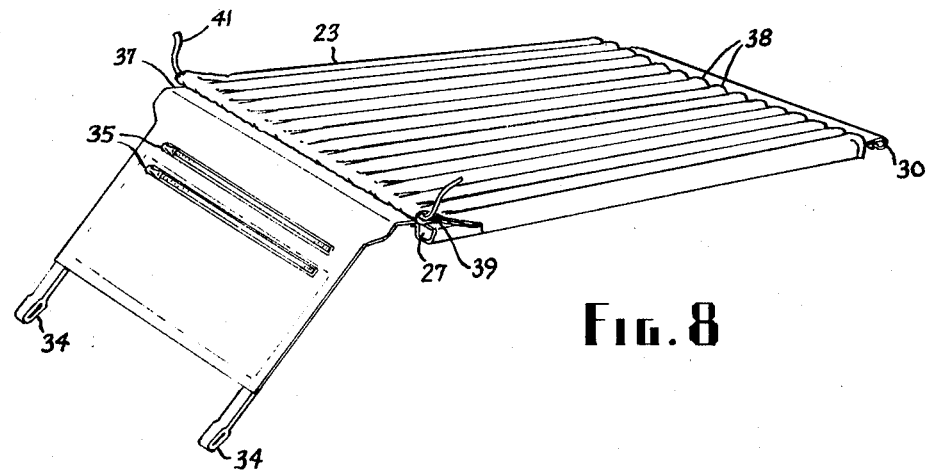
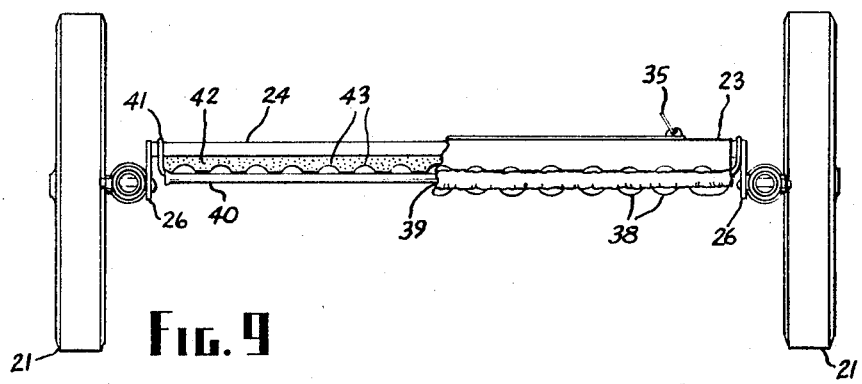
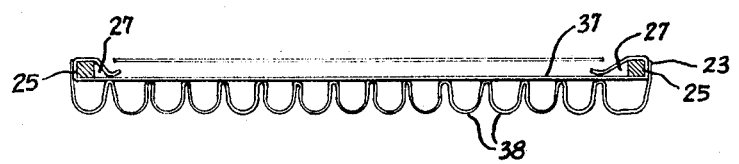

United States Patent Office 3,479,052
Patented Nov. 18, 1969

3,479,052
HAND-PULLED GOLF CART
James F. Spielman, North Road,
Bantam, Conn. 06750
Filed Aug. 7, 1967, Ser. No. 658,812
Int. Cl. B62d 1/18, 1/26
U.S. Cl. 280—41    3 Claims

ABSTRACT OF THE DISCLOSURE

The invention relates to a novel and useful hand-pulled cart for transporting golf clubs along a golf course, and reveals certain new basic characteristics and desirable features not found in golf carts in use before this time.

---

Many golf carts in present-day use have inherent inadequacies or undesirable characteristics which cause displeasure to the golfer. Among these deficiencies is a high center of gravity combined with a three-point base which together cause overturning of the cart while at rest as well as in motion, especially on side hills and imperfect terrain. Other shortcomings are awkwardness of handling and lack of miscellaneous article stowage space. Furthermore, folding of known carts for stowage or transporting is often difficult; and the folded size or envelope is large, cumbersome and space-consuming.

The overcoming of all of the inconveniences outlined above, plus additional detail objectives, have been the criteria from which the golf cart concept herein described has been evolved. It will be explained how the need for a conventional golf bag is eliminated; how a self-stowing resting seat is provided; how operation of the cart is automatic or easy to accomplish; and how the overall functional effectiveness of the new golf cart is due to the plan of employing a pulling frame portion on which the wheels are carried, while the golf club carrying rack portion of the cart is articulated at its upward end to the aft side of the pulling frame. Further features and advantages will become apparent.

A primary object of the invention is to provide a hand-pulled golf club cart which is easily collapsible to a compact size for stowage or transporting.

A second principal object of the invention is to create a low center of gravity during pulling to preclude overturning of the cart when pulled along imperfect terrain.

A third object is to provide a resting seat which automatically appears when the golf cart is caused to stand at rest.

Another object is to provide a golf club rack sheath which sheathes golf clubs individually while aligned in a plane, and which exposes the golf club heads for visual ease of selection.

Figure 1:
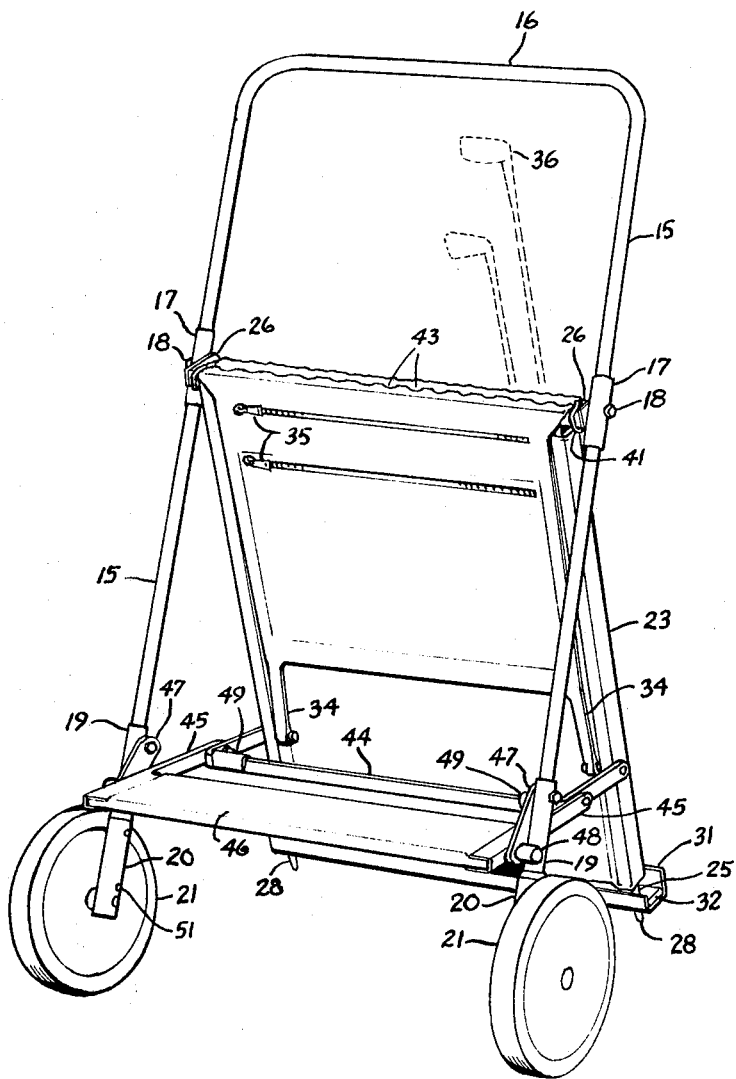
Figure 3:
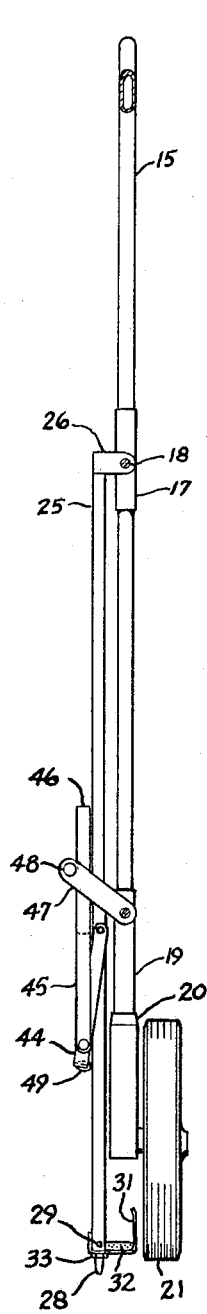
Figure 2:
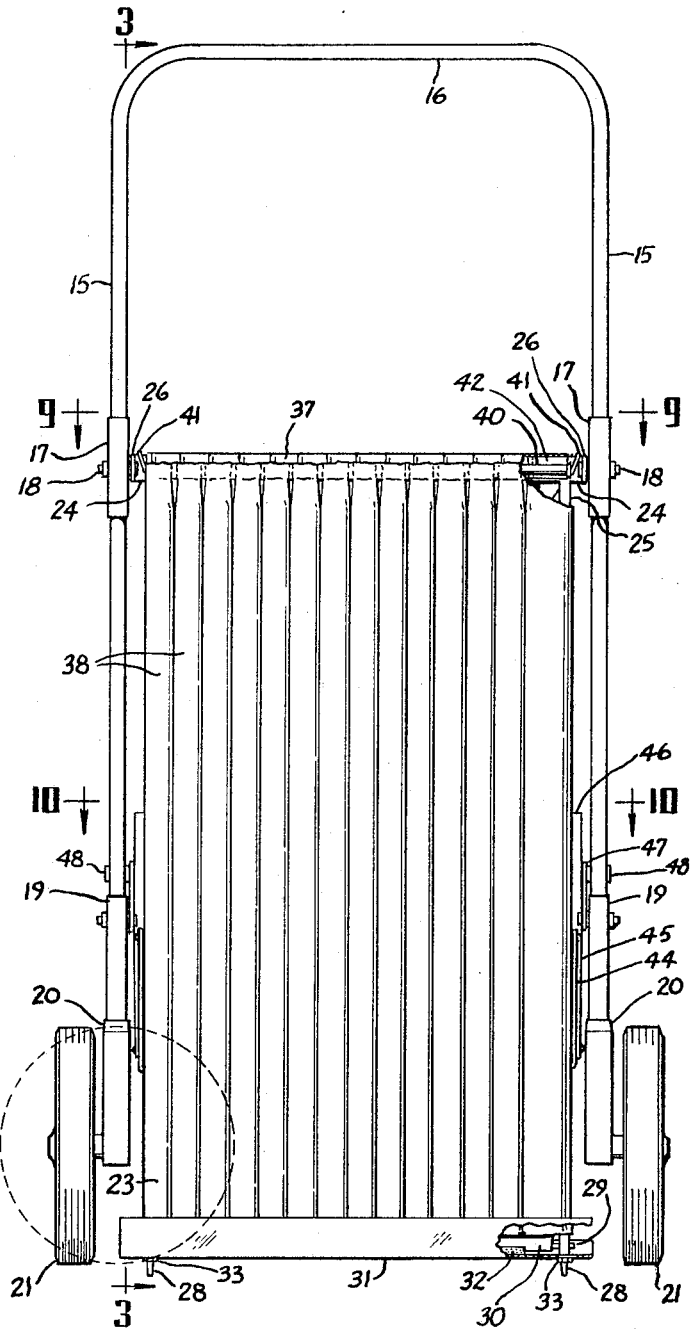

In the accompanying drawings: FIG. 1 is a perspective view seen from the front or forward side of the new golf cart when standing at rest; FIG. 2 is a plan view of the aft side of the cart, with clarifying cut-away portions; FIG. 3 is a cross-section with illustrative cut-away portions, taken substantially along line 3—3 of FIG. 2, showing the cart folded for storage and with the golf club holding sheath removed for clarity; FIG. 4 is an enlarged view of the lower part of FIG. 3 with appropriate revealing cross-sections and cut-away portions; FIG. 5 is an operational view, similar to FIG. 4, with the wheels rotated for cart use and with the golf club holding sheath removed; FIGS. 6 and 7 are schematic side views illustrating the operation of the cart on a golf course; FIG. 8 is a perspective view showing construction of the golf club sheath used; FIG. 9 is a cross-section taken along line 9—9 of FIG. 2, showing only the features desired for the view; and FIG. 10 is a line section taken along line 10—10 of FIG. 2, showing a part of the installation and construction of the golf club sheath.

The basic scheme of the new golf cart is illustrated with especial clarity in FIG. 1, where a preferred construction of the invention is shown in the at-rest or self-standing position. In substance the golf cart comprises a pulling frame member or unit mounted on two concentric wheels and inclined toward a counter-inclining carrying rack member to which it is pivoted. An outstretched folding mechanism, preferred to be shown, joins the pulling frame member with the carrying rack member at a level above and adjacent to the wheels to limit articulation of the carrying rack member to an acute angle relative to the pulling frame member. Invention is represented in the plan thus far described, a reality which will be readily realized when the explanation hereinafter reveals how this arrangement especially permits automatic folding and unfolding of the cart when it is operated in order to fulfill the objectives. The advantages gained are that the cart rests on a large rectangular base; that the center of gravity is lowered during pulling; that golf club heads are presented to the golfer at a desirable attitude in a neatly aligned array; that the folded cart is flat and compact; and that an ideal location for a seat upon which a golfer may rest is afforded by the scheme of operation.

Other features contribute to a desirable functional unit, especially a golf club sheath with pockets, index folding of the wheels, and a folding seat arrangement and its bearing on the folding and stability of the cart.

Then, in the illustrated form of the invention, a pulling frame has two parallel side tubes 15 joined integrally by a horizontal cross-member or hand-grip 16 at the upper end. Doubler sleeves 17 reinforce a pair of laterally aligned rack pivots 18. Carried rigidly toward the lower ends of the side tubes 15 are respective indexing sleeves 19, axle sleeves 20 rotatable around the indexing sleeves 19 and carrying horizontal wheel axles, wheels 21, and index retention springs 22 (FIG. 4), along with attaching hardware to later be described.

The pivots 18 connect the side tubes 15 of the pulling frame to a golf club carrying rack comprised primarily of a golf club sheath 23 which may be made of flexible material such as fabric. A rack frame, made to fit into and support the sheath 23, consists of a lateral cross-frame 24 at the upper end with a pair of parallel side rods 25 extending downward, and a pair of pivot brackets 26 embodying the upper pivot connecting to the pulling frame. When especially FIGS. 8 and 10 are observed, it is seen that the side rods 25 are inserted down through side loops 27 of the sheath 23. A pair of prongs or spikes 28 are then inserted upward into receptacle holes in the bottom ends of the side rods 25 (FIG. 4); and a lateral retaining bar 29 is passed through lateral apertures in the side rods 25 and in the spikes 28, as well as through a lateral lower loop 30 in the sheath 23. A laterally disposed base channel 31, carrying a resilient bumper pad 32 across its lower interior, is then placed by holes therein over the spikes 28 and secured by a pair of nuts 33 screwed onto the spikes 28. With the lower part of the carrying rack thus assembled, the sheath 23 is wrapped over the top of the cross-frame 24 and secured to the carrying rack some distance down the forward side by integral elastic loops 34 (FIGS. 1 and 8). The front or forward surface of the sheath 23 is seen to embody two lateral slide fasteners 35 (FIGS. 1 and 8) behind which stowage pockets for miscellaneous articles are contained.

FIGS. 8, 9 and 10 illustrate particularly an invention of a golf club sheath scheme wherein golf club shafts and handles insert downwardly (dotted lines FIGS. 1 and 6 and solid outline FIG. 5 with all golf clubs bearing the reference 36). The sheath 23 as already described then further involves a base portion or base surface 37 (FIGS. 8 and 10) and a plurality of golf club handle surround portions or surround tubes, 38 being examples. A larger surround tube is shown at the right of FIG. 10 for special articles such as an umbrella. The upward ends of the surround tubes, 38 being examples, are gathered beginning at a short distance before the top; and a collective lateral closure loop 39 (FIG. 8) through the surround portions is arranged to receive a cross-tube or pressure bar 40 (FIGS. 2 and 9). A resilient elastic cord 41 is stretched through the pressure bar 40 and tied or otherwise fastened at each end to the structure of the carrying rack, whereby to urge the pressure bar 40 toward the base surface 37 of the sheath 23. Underneath the upper end of the base surface 37 a separating pad 42 (FIGS. 2 and 9) containing separating notches, 43 being examples, aligned with the surround tubes, 38 being examples, is cemented along the lateral cross-frame 24 (FIG. 9). An aperture between the gathered surround portion and the base portion can be created by hand-lifting the pressure bar 40, for inserting golf clubs 36 handle first. Upon release of the pressure bar 40, the golf club shafts nest in respective separating notches, 43 being examples, and the handle ends rest on the bumper pad 32. Each golf club is thus individually sheathed and protected.

At a level above the wheels 21 (FIG. 1), a U shaped folding link 44 is pivoted to the carrying rack at either side and pivotally joins with a pair of seat extensions 45. The seat extensions 45 extend rigidly from a horizontally disposed seat 46. Fixed to the sides of the seat 46 a pair of seat brackets 47 extend upward and connect pivotally with the inner sides of the side tubes 15 by bolts extending also through the indexing sleeves 19. The seat 46 is well supported by a cross-bar 48 passing laterally thereunder. A pair of rubberlike bumpers 49 are added to the folding link 44 for soft abutment with the carrying rack when the cart is folded (FIGS. 3, 4 and 5).

FIGS. 3 and 4 illustrate the new cart in the completely folded form for transporting or storage. In this condition the wheels 21 lie in a plane parallel to and adjacent to the aft surface of the base channel 31 and prevent articulation of the carrying rack about the pivots 18 (dotted lines FIG. 2). The cart is thus a folded flat and locked unit.

Within the axle sleeves 20 (FIGS. 4 and 5), the retention springs 22 are installed in tension between cross-pins 50 at their upper ends and index-pins 51 at their lower ends. The cross-pins 50 are fixed laterally through the indexing sleeves 19 and are shorter in length than the diameter of interior circumferential grooves 52 (FIG. 4) in the axle sleeves 20. Apertures 53 permit installation of the cross-pins 50 through the sides of the axle sleeves 20. The index-pins 51 are fixed through the axle sleeves 20 and are urged into diametrically opposite index notches, 54 being an example, occurring every ninety degrees at the lower ends of the indexing sleeves 19. A golfer can thus hold the cart vertically and apply foot pressure to the upper sides of the wheels 21 and extend the springs 22 to an amount limited by engagement of the ends of the cross-pins 50 with the upper ends of the interior circumferential grooves 52. At this point the index-pins 51 pass out of the index notches, 54 being an example, and permit foot rotation of the wheels 21 ninety degrees to engage in the position shown in FIGS. 1, 2, 5, 6, 7 and 9. It is apparent that the same adjustment by foot can be reversed to restore the cart to the condition seen in FIG. 4.

The foregoing has described the illustrated form of the invention inasmuch as how the golf clubs are held and how the cart can be folded for storage and unfolded in an easy manner. The chosen intricacies of construction have been explained.

The cart, when unfolded, can be effectively employed by a golfer. FIGS. 1, 5, 6 and 7 illustrate the operation. The golfer may grasp the hand-grip 16 and pull the cart behind him moving in the direction to the left as FIG. 6 is observed. When the golfer wishes to stop and hit his ball he may raise the hand-grip 16 to a vertical position above the wheels 21, whereupon the spikes 28 will engage the turf and cause the carrying rack portion to stop at its lower end (FIG. 5). Then, momentum or inertia of the upper side of the carrying rack including the golf clubs will urge the pulling frame to continue to move forward beneath the hand-grip 16. The linkage, including the folding link 44, seat extensions 45, seat 46 and seat brackets 47, being freely pivoted with necessary clearances, will then begin to unfold (FIG. 5) and permit the wheels 21 to continue moving forward until the linkage is fully extended or outstretched as seen in FIGS. 1 and 7. Now the golfer can easily select a golf club to hit his ball, or he can sit on the seat 46.

The construction shown insures that the cart will not inadvertently fold due to the weight of the golfer sitting on the seat. First, the golfer is supported directly over the wheels 21 and by the sturdier elements of the cart including the cross-bar 48 which is urged by his weight to bear firmly against the indexing sleeves 19 (FIGS. 1 and 7). Secondly, the rigid positioning of the seat 46 caused by the weight of the golfer will maintain the seat extensions 45 and the folding link 44 from moving because the intermediate linkage pivot cannot then move downward without raising the golfer.

The linkage arrangement best seen in FIGS. 1 and 7 limits upward movement of the intermediate pivot of the linkage such that reaching alignment with the end pivots is precluded. The self-standing position is maintained by the inclined weight of the carrying rack and golf clubs which urge extension of the folding linkage. Because the linkage pivots are not aligned, a golfer may grasp the hand-grip 16 when the cart is self-standing as in FIG. 7 and pull the cart toward the left to cause the cart to automatically fold to the pulling condition seen in FIG. 6. At this time it will be noted that the carrying rack portion will then come to rest softly against the bumpers 49 and the face of the seat 46.

During pulling of the cart the center of mass will exist at a point downward from the pivots 18 and between the wide base of the wheels so that there is little tendency to overturn on slopes.

The objects of the invention are now seen to be fulfilled. The cart folds into a thin form. The cart has a low center of gravity against overturning. The cart rests on a rectangular base. The cart has an effective automatically folding seat. A new golf club sheath with desirable features has been revealed.

It will be recognized that the overall ability of the new golf cart to perform in a satisfactory manner, aside from detail refinements, is dependent upon the original concept of an auxiliary frame upon which the wheels are carried, or a pulling frame member such as described above. When a golf club carrying rack is arranged to articulate from the aft or following side of a pulling frame the functional objectives can all be realized, or realized in part as one may elect.

Hand-pulled golf carts which receive golf club heads downward with the handles upward are known; and the illustration of the golf club heads upward is by choice. The indexing plan used for the wheels is an expedient one, and other indexing methods are known. Golfing accessories may be added to the new cart.

I claim:
1. In a hand-pulled cart for transporting golf clubs along a golf course, the combination of: a pulling frame member, said pulling frame member embodying a pair of wheel elements, said wheel elements being spaced apart one from the other on a common horizontal axis of rotation, axle elements for each of the said wheel elements, a pair of side frame elements adjacent to and respective one to each of the said wheel elements and attached to the said axle elements, said side frame elements thereby being turnable with the said axle elements relative to the said wheel elements to a vertical position, said side frame elements then each extending perpendicularly upward from the said axle elements in a plane aligning with the said common axis for the said wheel elements, and a cross-element joining the said side frame elements one with the other substantially at the upper ends thereof; a golf club carrying rack member, said carrying rack member embodying provisions for receiving golf clubs in a substantially vertical array, said carrying rack member embodying a pivotal attachment toward the upper end thereof on an axis substantially parallel with the said common axis of rotation for the said wheel elements, said pivotal attachment joining the said carrying rack member to the said pulling frame member at a location downward from the said cross-element thereof and upward from the said wheel elements thereof, said carrying rack member extending from the said pivotal attachment downward along the said plane of the said pulling frame member to approximately the level of the lower reaches of the said wheel elements, said pivotal attachment permitting articulation of the said carrying rack member away from the said pulling frame member in the direction opposite from the direction in which the cart is intended to be pulled; a knuckling linkage, said knuckling linkage being located at a level above the upper reaches of the said wheel elements and below the said pivotal attachment for the said carrying rack member, said knuckling linkage being pivotally attached on a lateral axis at a first end thereof to the said pulling frame member and pivotally attached on a lateral axis at a second end thereof to the said carrying rack member, said knuckling linkage embodying an intermediate pivot whereabout the same may fold downward, said knuckling linkage extending generally downward from the said first and second ends thereof when the said carrying rack member is articulated adjacent to the said pulling frame member, said knuckling linkage extending generally outstretched horizontally to limit articulation of the said carrying rack member when the same is articulated away from the said pulling frame member, said intermediate pivot of the said knuckling linkage being limited in upward movement to not reach alignment with the said pivotal attachments at the said first and second ends of the said knuckling linkage, and a seat element mounted to the said knuckling linkage on the said first end thereof, said seat element extending laterally between the said side frame elements of the said pulling frame member, said seat element lying in a substantially horizontal plane when the said carrying rack member is articulated to the maximum away from the said pulling frame member and when the said wheel elements and the lower end of the said carrying rack member are at rest on a horizontal surface.

2. A golf cart as set forth in claim 1 wherein an indexing system is included for each of the said wheel elements, said indexing system providing for locking of each of the said wheel elements in axial alignment, said indexing system providing for manual turnable adjustment of each of the said wheel elements about substantially vertical axes to lock in a turned position of approximately ninety-degrees starting movement in the direction opposite to the direction in which the cart is intended to be pulled, said wheel elements thereby abutting the sides thereof against the said carrying rack member and obstructing the same from articulation relative to the said pulling frame member.

3. In a hand-pulled cart for transporting golf clubs along a golf course—a golf club carrying rack system, said carrying rack system comprising basically: a golf club sheath, said sheath containing a plurality of tubes lying aligned in a common plane and arranged to receive golf club handles inserted in a downward direction, said plurality of tubes being constructed of flexible material, said plurality of tubes being constructed to have base portions and surround portions, said sheath further containing a common closure element spanning the upward end of the sheath thereof under tension to urge collective closure of the said surround portions of the said plurality of tubes against the said base portions thereof.

References Cited

UNITED STATES PATENTS

| 2,726,875 | 12/1955 | Murcott | 280—41 |
| 3,014,760 | 12/1961 | Gard. | |
| 3,291,502 | 12/1966 | England | 280—41 |
| 3,360,279 | 12/1967 | Hunt | 280—41 |

LEO FRIAGLIA, Primary Examiner

J. E. SIEGEL, Assistant Examiner

U.S. Cl. X.R.

150—1.5